Sept. 18, 1956
M. H. REDMER
2,763,312
NUT AND BITING-TOOTHED LOCKED WASHER
WITH A SHEARABLE CONNECTION
Filed May 14, 1953
2 Sheets-Sheet 1
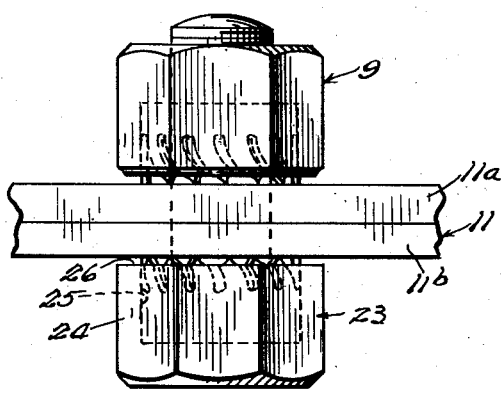
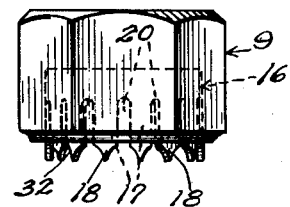
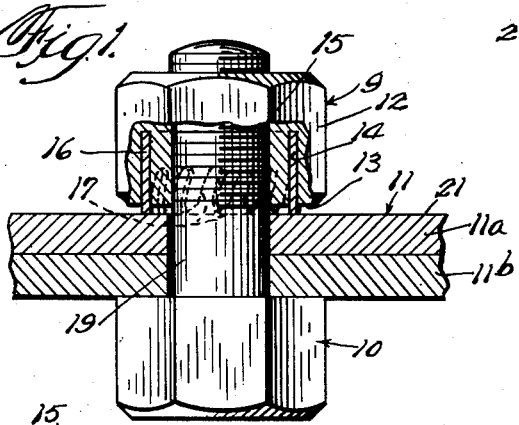
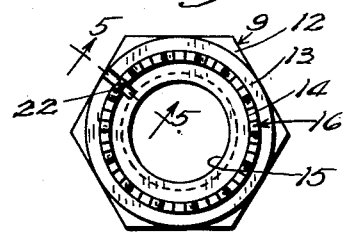
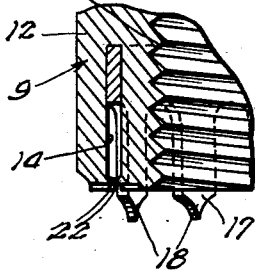
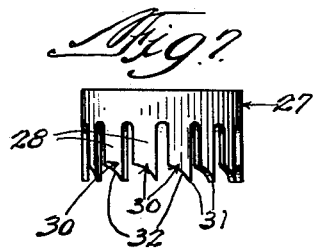
INVENTOR.
Martin H. Redmer.
BY
Thiess, Olson & Mecklenburger
Attys Sept. 18, 1956  M. H. REDMER  2,763,312
NUT AND BITING-TOOTHED LOCKED WASHER
WITH A SHEARABLE CONNECTION
Filed May 14, 1953  2 Sheets-Sheet 2

INVENTOR.
Martin H. Redmer
BY
Thiess, Olson, Mecklenburger,
von Holst, & Coltman.
Attys

United States Patent Office 2,763,312
Patented Sept. 18, 1956

2,763,312
NUT AND BITING-TOOTHED LOCKED WASHER WITH A SHEARABLE CONNECTION

Martin H. Redmer, Chicago, Ill.

Application May 14, 1953, Serial No. 355,005

6 Claims. (Cl. 151—37)

This invention relates to locking devices and more particularly to a nut having a self-contained locking piece and is a continuation-in-part of my copending application Serial No. 219,595, filed April 6, 1951, and now abandoned.

The nut in this instance is adapted particularly for use in structures which are required to withstand excessive vibrational forces. Various lock nuts have heretofore been proposed which are of such design that, once they have been drawn up tight on a bolt shank, they cannot be loosened or unlocked without seriously injuring the nut, bolt, or the object against which the nut abuts.

Thus it is one of the objects of this invention to provide a lock nut which when drawn up tight into a locked position will effectively remain in such a position even though subjected to excessive vibrational forces; but, may be released from this locked position only by a substantial, positive, unthreading force being exerted thereon with a wrench or the like.

It is a further object of this invention to provide a locking nut which may be released from a locking position without resulting in damage to the nut, the threaded shank on which it is mounted, or the object against which the nut abuts.

It is a further object of this invention to provide a locking nut having a self-contained locking piece which facilitates handling of the nut.

It is a still further object of this invention to provide a locking nut which does not require an excessive tightening force to be applied thereto in order to effect positive locking of the nut in place.

It is a still further object of this invention to provide a locking nut which is simple in construction, effective in operation, and inexpensive to produce.

Further and additional objects will appear from the description, accompanying drawings and appended claims.

In accordance with one embodiment of this invention, a locking device is provided for use with a relatively fixed member for securing an object between said device and member. The device comprises a body portion threadably mounted on a part of the fixed member and having a surface thereof, adjacent the object, provided with an annular recess. Snugly seated within the recess is a resilient ringlike piece having an exposed serrated edge portion. The serrations are adapted to abut the surface of the object when the device is in locking relation and thereby prevent relative movement or slipping of the device with respect to the object. The piece and body element are adapted to normally move as a unit except when the device is being released from a fully locked position by a positive turning force being applied thereto.

For a more complete understanding of this invention reference should be made to the drawing, wherein:

Figure 1 is a fragmentary side elevational view partially in section of a lock nut and bolt combination showing the nut drawn up tight into locking relation with an object;

Fig. 2 is a side elevational view of the lock nut alone;

Fig. 3 is a bottom view of the lock nut shown in Fig. 2;

Fig. 4 is a side elevational view of one form of locking piece which is adapted for use with either left-handed or right-handed lock nuts;

Fig. 5 is an enlarged fragmentary sectional view of the lock nut taken along line 5—5 of Fig. 3;

Fig. 6 is a fragmentary side elevational view of the lock nut shown in combination with a modified bolt;

Fig. 7 is a side elevational view of a modified form of lock piece which is adapted for use on a right-hand, or clockwise rotatable, nut;

Figures 8, 9:
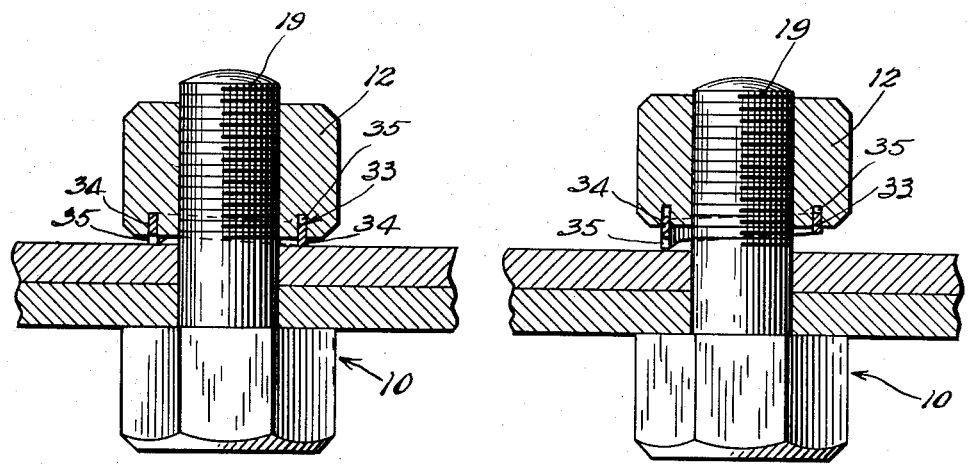
Fig. 8 is similar to Fig. 1, but showing a modified form of locking nut drawn up tight on the bolt.
Fig. 9 is similar to Fig. 8 but showing the modified form of locking nut in an unlocked position.

Referring now to the drawings and more particularly to Fig. 1, a locking device in the form of a right-handed, or clockwise rotatable, lock nut 9 is shown threadably mounted on the shank of bolt 10 and in locking relationship with respect to an apertured object or member 11, which in this instance comprises a pair of flat plates 11a and 11b arranged in face-to-face relationship.

The lock nut 9 comprises a body portion or element 12 having a polygonal periphery and an annular recess 14 formed in the face 13 thereof adjacent the member 11. The recess 14 is disposed concentrically with respect to a center, internally-threaded bore 15 formed in the body portion 12. The depth of recess 14 is approximately one-half the thickness, or height, of the body portion 12.

Snugly fitted within recess 14 is an annular lock piece 16 which is seen more clearly in Fig. 4. A modified form of lock piece 27 is shown in Fig. 7 which will be described more fully hereinafter. One edge of piece 16 abuts the bottom of the recess and the opposite edge thereof and has a plurality of spaced, symmetrically arranged fingers 17 formed therein which project beyond surface 13. The length and width of the fingers 17 and the spacing 20 between adjacent fingers are such as to enable the fingers to yield when the nut and bolt are drawn up tight into locking relation with member 11. The ends 18 of fingers 17 are pointed, as seen more clearly in Fig. 4. It is to be noted that the pointed ends 18 of fingers 17 of piece 16 are disposed on the longitudinal center line of the fingers. Thus, piece 16 is adapted for use with either right- or left-handed nuts or bolts. The direction of yield of the fingers 17 depends upon the direction of rotation of the nut 9 to effect the locking relationship. When the nut is being drawn up tight, the fingers 17 provide a relatively small amount of resistance because of their yieldability; however, when the nut is sought to be rotated in the opposite direction, the pointed ends 18, because of the angular disposition of the fingers, tend to bite into the abutted surface 21 of plate 11a and prevent movement of the piece in that direction.

The piece 16 is adapted to snugly fit within recess 14 and is prevented from moving independently of the body portion 12, under normal conditions, by opposing protuberances 22 formed on the sides of the recess 14 and projecting into one of the spacings 20 formed intermediate adjacent fingers 17. The protuberances 22 in this instance are formed by peening over a portion of the edges of the recess 14, as seen in Figs. 3 and 5. The protuberances 22 prevent relative movement of piece 16 when the nut is drawn up tight in locking relation; however, when the nut is rotated in the opposite direction to effect release thereof from a fully locked position, the piece 16 is held fast by the pointed ends 18 of the fingers and thus the turning force exerted on the body portion 12 by a wrench or the like, if sufficiently great will cause the protuberances to be sheared off by piece 16, whereupon the body portion 12 may be rotated independently of the piece until the fingers 17 relax their bite on plate 11a. After the nut and piece have been removed from the bolt, the piece 16 can be readily reset in the recess and new protuberances formed on the edges of the recess. The shearing off of the protuberances is of no consequence as the nut may easily be made ready for subsequent use by forming new protuberances.

In Fig. 6, the lock nut 9 is shown used in combination with a modified form of bolt 23 which has the bolt head 24 thereof provided with an annular recess 25 formed in the face 26 thereof adjacent plate 11b. The recess 25 is of the same shape and size as recess 14 heretofore described and is adapted to have seated therein lock piece 16 or 27. The offsetting in opposite directions of the fingers 17 of the lock pieces mounted within recesses 14 and 25 of nut 9 and bolt head 24, respectively, as seen in Fig. 6, is due to the bolt and nut being rotated in opposite directions relative to one another into locking relation with respect to member 11. However, under normal conditions, the bolt or nut would remain in a relatively stationary position while the other is rotated and, therefore, fingers 17 of the stationary member would remain relatively straight and the pointed ends 18 thereof bite into the abutting surface in an axial direction with respect to the piece.

In Fig. 7, a modified form of lock piece 27 is shown for use particularly with a right-handed, or clockwise rotatable, nut or bolt and has the fingers 28 thereof provided with pointed ends 30, the tips 31 of which are offset with respect to the longitudinal centerline of the fingers. The relative disposition of the tip of the pointed end 30 is such that, when the nut is rotated in a clockwise direction, the ends 30 will not materially obstruct the rotation of the nut. When the nut, however, is rotated in a counterclockwise direction the tips 31 of the pointed ends 30 will readily bite into the surface of member 11 and hold the piece in a stationary position with respect to the member 11. Lock piece 27 may be modified for use with a left-handed or counterclockwise rotatable, nut or bolt by causing the tip of the pointed end to be disposed on the opposite side of the centerline of the finger.

It will be noted that the tapered sides or side 32 of the fingers forming the pointed ends of piece 16 or 27 are slightly concave; this is so that regardless of the amount the fingers yield under pressure, the side 32 will never be flush with the abutted surface and the tips 31 of the fingers will always tend to bite into the abutted surface of the member 11 when it is sought to release the nut or bolt from a locked position.

Figure 10:
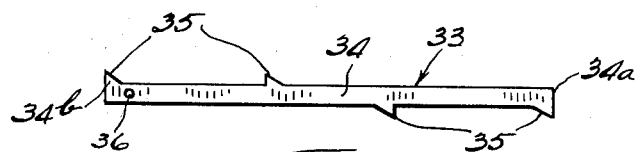
Fig. 10 is a layout view of a modified form of lock piece.
Figure 11:
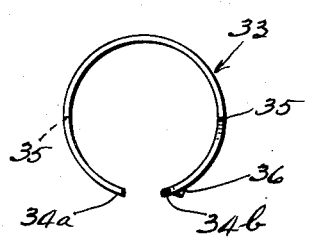
Figs. 11 and 12 are respectively top plan and side elevational views of the lock piece shown in Figs. 8, 9, and 10.
Figure 12:
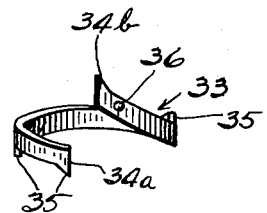

Figs. 10 through 12 show a second modified form of lock piece 33 which, as seen in Figs. 8 and 9, is adapted to be used with a lock nut having a body portion 12 and an annular recess 14 formed therein similar to that described in regard to Fig. 1. Lock piece 33 is initially stamped from a piece of flat spring steel to form an elongated body portion 34, as seen in Fig. 10. A plurality of serrations 35 are formed along the longitudinal sides of the body portion 34. Subsequent to the stamping of the body portion 34, the latter is subjected to a deforming operation wherein a helix is developed, as seen in Fig. 12. The ends 34a and 34b of body portion 34 are spaced from each other, as seen in Fig. 11. The serrations 35 formed on one side of body portion 34 extend upwardly and the serrations formed on the opposite side of the body portion 34 extend in the opposite direction, as seen in Fig. 12. A nose or protuberance 36 is formed in the outer periphery of the body portion 34 when the latter is being deformed. The nose 36 is adapted to wedge itself into the recess 14 formed in the body portion 12 of the nut when the lock piece is inserted within the recess thereby frictionally retaining the lock piece in assembled relation with respect to the nut. As seen in Fig. 9, one end of the body portion 34 extends downwardly from the underside of the nut a greater distance than the other end of the body portion 34 when the nut is in a released position with respect to the bolt 19. However, when the nut is drawn up tight on the shank of the bolt the lock piece, due to the fact that it is formed of resilient spring steel, is caused to assume a substantially cylindrical shape whereby the upwardly extending serrations bite into the base of the recess 14 formed in the nut body portion 12 and the serrations extending downwardly bite into the adjacent surface of the members 11 which are disposed between the nut body portion 12 and the head of the bolt 10. By reason of the relative disposition of the serrations formed in the body portion 34 of the lock piece 33, the friction developed between the nut body 12 and the members 11 being clamped is greatly increased. When the lock piece 33 is subjected to a force sufficient to cause it to assume a circular position, as shown in Fig. 8, a force is exerted by the lock piece on the nut body 12 which tends to cause the latter to bind relative to the shank 19 of the bolt 10.

Thus it will be seen that a nut or bolt having a self-contained locking piece has been provided which may be released from a fully locked position only upon a positive unthreading turning force being applied thereby by a wrench and the like, without causing serious damage to the nut, bolt, or abutted object.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A rotatable device for use with a threaded member for locking an object between said device and member upon rotation of said device in one direction relative to said member, said device comprising a member-engaging body element provided with an internally threaded center bore for cooperating with a portion of said member, said element having a substantially flat surface disposed adjacent said object and provided with a substantially smooth annular recess substantially concentric with said threaded center bore, a substantially smooth cylindrical object-contacting piece having substantially flat, smooth surfaces seated within and rotatable within said recess, said piece having a portion thereof protruding axially from said recess and having a plurality of yieldable pointed elongated circumferentially spaced and deformable fingers formed therein, said fingers being normally disposed substantially parallel to the axis of rotation of said device, and a shearable protuberance extending from said body element into said recess intermediate adjacent fingers the pointed end of each of said fingers being circumferentially offset with respect to the longitudinal centerline of said fingers.

2. A rotatable device for use with a member having a threaded shank for locking an object between said device and member upon rotation of said device in one direction relative to said member, said device comprising a threaded shank-engaging body element having a substantially flat surface provided with a substantially smooth annular recess disposed substantially concentric with respect to the axis of rotation of said device, a substantially smooth cylindrical piece seated and rotatable within said recess and having an exposed object-contacting circumferentially deformable serrated portion, and a shearable protuberance formed on said body element and extending into said recess and intermediate adjacent serrations.

3. A rotatable device for use with a member having a threaded shank for locking an object between said device and member upon rotation of said device in one direction relative to said member, said device comprising a threaded shank-engaging body element having a substantially flat surface adjacent said object provided with a substantially smooth annular recess disposed concentrically with respect to the axis of rotation of said device, a substantially smooth cylindrical piece snugly held within said recess and having one edge thereof exposed and provided with a plurality of circumferentially deformable spaced, axially-extending object-contacting fingers arranged symmetrically about the axis of rotation of said device, and a piece-retaining shearable protuberance formed on said body element and disposed within said recess intermediate adjacent fingers.

4. A rotatable device for use with a member having a threaded shank for locking an object between said device and member upon rotation of said device in one direction relative to said member, said device comprising a threaded shank-engaging body element having a substantially flat surface adjacent said object provided with a substantially smooth annular recess disposed concentrically with respect to the axis of rotation of said device, a substantially smooth cylindrical piece rotatably mounted and yieldably held within said recess, said piece having one edge thereof exposed and provided with a plurality of elongated symmetrically arranged circumferentially deformable object-engaging fingers, and shearable means formed on said body element and extending within said recess and cooperating with said piece for holding the latter therein and effecting nonrotation of said piece relative to said body element except upon releasing said device from a fully locked relation with respect to said object.

5. A rotatable device for use with a threaded member for locking an object between said device and member upon rotation of said device in one direction relative to said member, said device comprising a member-engaging body element provided with an internally threaded center bore for cooperating with a portion of said member, said element having a substantially flat surface disposed adjacent said object and provided with a substantially smooth annular recess substantially concentric with said threaded center bore, a substantially smooth cylindrical object-contacting piece having substantially flat, smooth surfaces seated within and rotatable within said recess, said piece having a portion thereof protruding axially from said recess and having a plurality of circumferentially deformable pointed elongated circumferentially spaced fingers formed therein, said fingers being normally disposed substantially parallel to the axis of rotation of said device, and a shearable protuberance extending from said body element into said recess intermediate adjacent fingers, the pointed end of each of said fingers being circumferentially aligned with respect to the longitudinal centerline of said fingers.

6. A rotatable device for use with a threaded member for locking an object between said device and member upon rotation of said device in one direction relative to said member said device comprising a member-engaging body element provided with an internally threaded center bore for cooperating with a portion of said member, said element having a substantially flat surface disposed adjacent said object and provided with a substantially smooth annular recess substantially concentric with said threaded center bore, a substantially smooth cylindrical object-contacting piece having substantially flat, smooth surfaces seated within and rotatable within said recess, said piece having a portion thereof protruding axially from said recess and having a plurality of circumferentially deformable pointed elongated circumferentially spaced fingers formed therein, said fingers being normally disposed substantially parallel to the axis of rotation of said device, and a shearable protuberance extending from said body element into said recess intermediate adjacent fingers.

References Cited in the file of this patent

UNITED STATES PATENTS

| | | |
|---|---|---|
| 301,085 | Brandon | July 1, 1884 |
| 325,589 | Card | Sept. 1, 1885 |
| 326,076 | White | Sept. 8, 1885 |
| 482,910 | Wrenshall | Sept. 20, 1892 |
| 734,579 | Lenholt | July 28, 1903 |
| 1,919,205 | D'Halloy | July 25, 1933 |
| 2,424,208 | Poupitch | July 15, 1947 |

FOREIGN PATENTS

| | | |
|---|---|---|
| 109,074 | Sweden | Nov. 16, 1943 |
| 463,688 | Italy | May 21, 1951 |